US012534306B2

(12) United States Patent
Forbes et al.

(10) Patent No.: US 12,534,306 B2
(45) Date of Patent: Jan. 27, 2026

(54) OBJECT TRACKING AND ZONE CONTROL SYSTEM

(71) Applicant: 20/20 Robotics, LLC, Durham, NC (US)

(72) Inventors: Michael Brendan Forbes, Durham, NC (US); Ryan D. Norkett, Lacona, NY (US)

(73) Assignee: 20/20 Robotics, LLC, Durham, NC (US)

(*) Notice: Subject to any disclaimer, the term of this patent is extended or adjusted under 35 U.S.C. 154(b) by 251 days.

(21) Appl. No.: 18/236,100

(22) Filed: Aug. 21, 2023

(65) Prior Publication Data

US 2025/0066135 A1 Feb. 27, 2025

(51) Int. Cl.
B65G 43/08 (2006.01)
H04N 23/90 (2023.01)

(52) U.S. Cl.
CPC ............. *B65G 43/08* (2013.01); *H04N 23/90* (2023.01); *B65G 2203/025* (2013.01); *B65G 2203/041* (2013.01)

(58) Field of Classification Search
CPC .. H04N 23/90; B65G 43/08; B65G 2203/025; B65G 2203/041
See application file for complete search history.

(56) References Cited

U.S. PATENT DOCUMENTS

| 7,233,840 | B2* | 6/2007 | Schiesser | B65G 15/22 198/395 |
| 11,724,895 | B1* | 8/2023 | Kocheta | B07C 3/08 700/217 |
| 2018/0197139 | A1* | 7/2018 | Hill | G06Q 10/0832 |
| 2018/0374239 | A1* | 12/2018 | Wallack | H04N 23/90 |
| 2019/0031452 | A1* | 1/2019 | Koga | B65G 47/905 |
| 2020/0324974 | A1 | 10/2020 | Gorman | |
| 2021/0035313 | A1 | 2/2021 | Ghadyali | |
| 2021/0112154 | A1 | 4/2021 | Rodriguez | |
| 2021/0311162 | A1 | 10/2021 | Mai | |
| 2022/0080466 | A1 | 3/2022 | Parr | |
| 2022/0351362 | A1* | 11/2022 | Bayer | B08B 3/08 |
| 2023/0040513 | A1 | 2/2023 | Ryan | |
| 2023/0045211 | A1* | 2/2023 | Laskis | B65G 47/28 |
| 2024/0001406 | A1* | 1/2024 | Small | B07C 5/36 |

FOREIGN PATENT DOCUMENTS

| DE | 102017104998 A1 * | 9/2018 | ............. B65G 43/08 |
| WO | WO-2019222128 A1 * | 11/2019 | ............... B07C 1/04 |

* cited by examiner

Primary Examiner — James R Bidwell
(74) Attorney, Agent, or Firm — Slater Matsil, LLP

(57) ABSTRACT

Systems for tracking objects in a production process and controlling aspects of the production process utilize images from a plurality of cameras positioned above or around various locations of the production process, which transmit images to a server, in various embodiments. The server uses machine learning or artificial intelligence to locate and track the objects within the fields of view of the various cameras, and then control production process aspects in response. Other embodiments may be described and/or claimed.

22 Claims, 6 Drawing Sheets

NON-TRANSITORY COMPUTER-READABLE STORAGE MEDIUM
1602

PROGRAMMING INSTRUCTIONS 1604
CONFIGURED TO CAUSE A DEVICE, IN RESPONSE TO EXECUTION
OF THE PROGRAMMING INSTRUCTIONS, TO PRACTICE (ASPECTS
OF) EMBODIMENTS OF THE PROCESS(ES) DESCRIBED
THROUGHOUT THIS DISCLOSURE.

FIG. 6

OBJECT TRACKING AND ZONE CONTROL SYSTEM

TECHNICAL FIELD

Disclosed embodiments are directed to systems and methods for managing production processes, and specifically to systems and methods for tracking objects in a production process and controlling the process in response to the object tracking.

BACKGROUND

Production processes for manufacturing goods may involve multiple steps, starting with various raw materials, to progressively form the desired finished product. Often these steps are determined by engineering considerations, where the operations necessary to form the final product from a given starting material(s) are analyzed to determine how they can be best carried out using automation. Sometimes, this may require breaking down a single step that may be performed manually into multiple steps that are better suited to automated operation. Once the steps to form a manufactured good are determined, a production line or process may be designed.

Such production lines or processes may be controlled to varying extents by automatic control systems. These control systems may rely on one or more sensors to monitor various aspects of the production process, with the sensor feedback being used to adjust operation of the production process to account for various detected conditions and/or anomalies. For example, sensors may be used to determine when a particular step in the production process may have not been properly carried out, such as when the raw material is misshapen or defective, a machine in the process has jammed, or an item being produced is incorrectly positioned. Similarly, sensors may be used to control flow of the production line. For example, when a machine processes items in a batch, sensors may determine when a sufficient quantity of items has amassed from the previous production step to allow the machine to process a new batch of items. In response to the time or speed of a process, sensors may be used to adjust the speed of a conveyor which transports items between process steps. In yet another example, sensors may be used to control the time or speed of a process, such as where the time required for a process depends upon the condition of a given item. One such scenario could be whether a piece of wood reaches a desired moisture level; as wood is an organic material subject to natural variations, the amount of time for a given piece of wood to reach a target moisture level may vary. Sensors can be used to measure a current moisture amount, and control any steps necessary to achieve the desired moisture level.

The background description provided herein is for the purpose of generally presenting the context of the disclosure. Unless otherwise indicated herein, the materials described in this section are not prior art to the claims in this application and are not admitted to be prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 6 is a block diagram of a computer-readable storage medium that can be used to implement some of the components of the system or methods disclosed herein, according to various embodiments.

DETAILED DESCRIPTION

Figure 1:
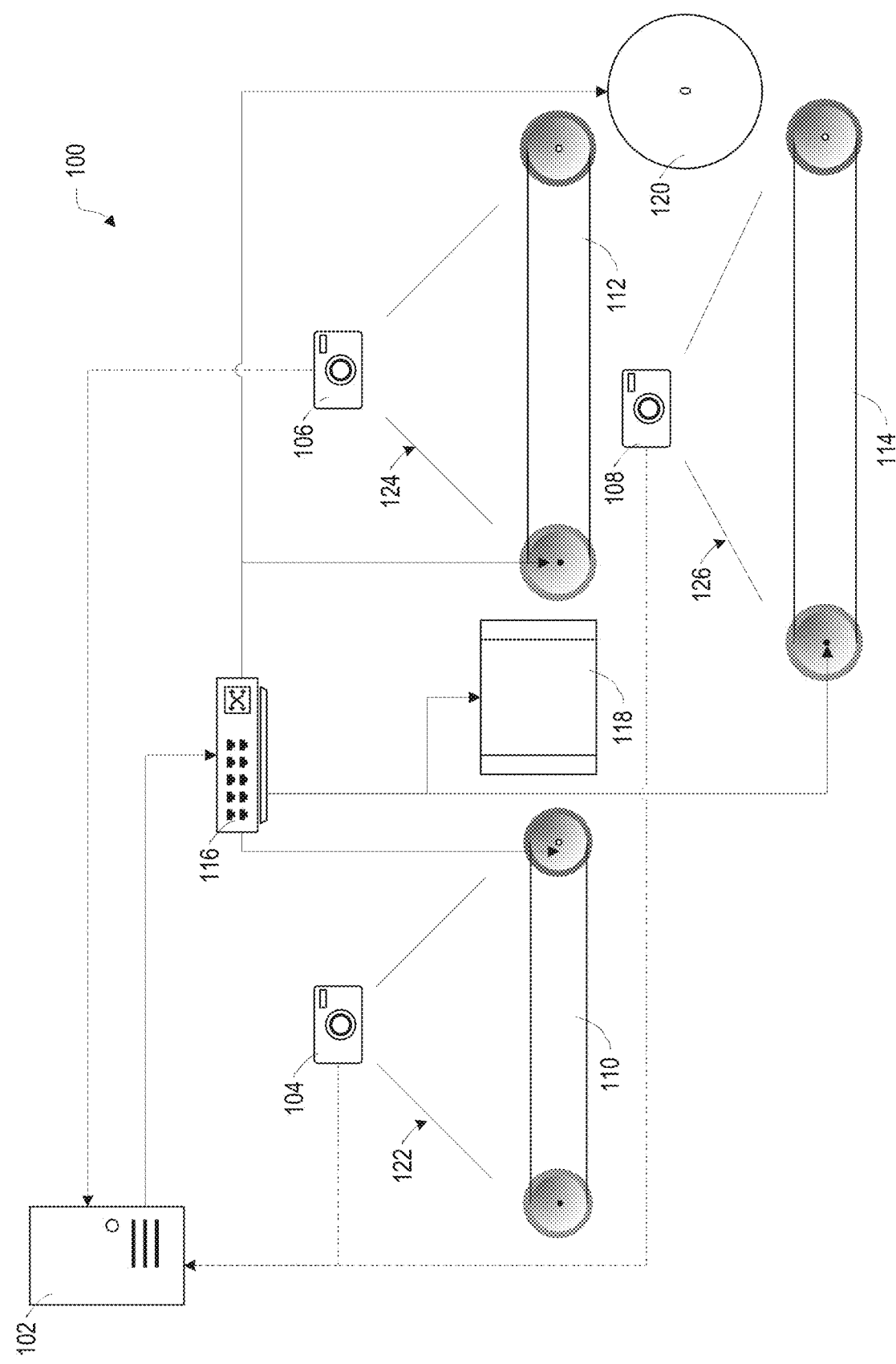
FIG. 1 illustrates an example system for object detection and tracking, and using such information for controlling of a production process, according to various embodiments.

Many production processes are controlled using various types of sensors. One common sensor used to monitor a production process and detect the presence or absence of an item is a photoelectric sensor. Photoelectric sensors come in a variety of different types, but generally rely on detection of the presence or absence of a beam of light. In one type of sensor implementation, a light source may transmit a beam to a sensor across a space. When an object passes through the space, it may briefly interrupt the beam, which the sensor will detect. In a typical implementation, the location of the sensor is fixed and known, so the interruption thus alerts the system controlling the production process of the presence and location of the object. By placing such sensors throughout the production process and with knowledge of the time needed to complete various operations and/or the speed of any conveyors, the location of each object passing through the production process can be ascertained. With this information, the system controlling the production process may be enabled to adjust various aspects of the production process as necessary.

However, photoelectric sensors, as well as various other types of sensors, typically have to be positioned relatively proximate to the production line, and thus in proximity to moving objects and machinery. Misaligned and/or non-conforming objects may contact such sensors, knocking them out of alignment or otherwise disabling them. In some production processes, various steps may generate significant debris, dust, and/or other contaminants, which may foul or obscure the sensors. As a result, frequent maintenance may be needed to keep the sensors in working order so that the production process can be properly controlled. This maintenance may require shutting down the production process on a periodic basis to allow the sensors to be cleaned, repositioned, and/or replaced, which results in lost productivity and revenue, to say nothing of the increased costs required by the frequent maintenance. Some sensors may have problems endemic to their nature. For example, barcode scanners or readers track objects passing through a production process. However, if a barcode affixed to an object is damaged or is not properly adhered and falls off, that object can no longer be tracked. Thus, there is a need for an improved way to monitor a production process that is relatively immune to these drawbacks.

Disclosed embodiments include a system for controlling a production process that employs a plurality of cameras to monitor objects in the production process, and adjust the process in response to the images captured by the cameras. In embodiments, the cameras can be mounted at various locations in the production process that are to be tracked. The cameras may be mounted overhead of the various locations, at a distance that is generally free from the possibility of being impacted by an object or some portion of the production process, and generally clear of any debris or contaminants that may be generated by a given production process step. Alternatively, the cameras may be mounted around the various locations at such distances and positions so as to be clear of debris or contaminants, and risk of impact. Thus, the amount of maintenance required can be reduced from existing solutions that rely upon sensors that must be positioned more proximate to the production process.

Furthermore, the use of cameras, in embodiments, can be combined with machine learning (ML) and/or other types of artificial intelligence (AI), e.g., artificial neural networks (ANNs), to enhance recognition and tracking and control of objects as they move through the production process. In embodiments, the ML system can be used to locate a particular object within an image of one of the cameras and assign it a unique identifier. The location of the identified object can then be tracked as it moves through the fields of view of the various cameras as the object progresses through the production process. Tracking can be performed visually using the images and/or by inferring the position based upon known speeds of various equipment in the production process, such as conveyor belts, carousels, turntables, and other such implements. In such embodiments, it may be sufficient that the ML system identify and locate the object in a field of view of a first camera, after which the position may be inferred without further need of the ML system. In other embodiments, the ML system is used to identify and potentially track the object with images from each camera as the object passes through each camera's field of view. With this tracking, aspects of the production process may be controlled, e.g. modifying the speed of equipment such as conveyors, triggering machinery to open that is accumulating objects for batch processing, diverting objects down different branches of the production process (such as when there are variations of the produced object, e.g. different colors or finishes, or other aspects), sorting for shipping to different locations in a distribution center, and/or otherwise helping to ensure an efficient and accurate production process.

The appearance of the object may change as it moves through the production process. For example, if the production process is assembling an object from raw materials, its appearance will likely be altered with each consecutive step in the production process as it moves to completion. In some embodiments, the ML system may further be trained to recognize the appearance of the object as it moves through the various stages or steps of the production process, so that accurate tracking can be maintained. Furthermore, in still other embodiments, the change in appearance can be anticipated and, if a particular object does not match its expected appearance at a given stage of production, could signal the system about either a non-conforming object or possible anomaly in the production process. This information could further be used, in yet other embodiments, to adjust various aspects of the production process. Other embodiments may be possible, and may be discussed herein.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (Band C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates an example system 100 for tracking objects in a production process, and controlling the process in response. The production process may be any process for fabricating, handling, processing, packaging, or any other actions to be performed on materials of any type. Some examples of production processes may include assembly lines for products, packaging lines, bottling lines, or any other process that can be served by automatic monitoring and control. System 100 includes a central server 102, which receives input from a plurality of cameras, such as cameras 104, 106, and 108. These connections are illustrated by the dashed lines. Each of the cameras 104, 106, and 108 is positioned overhead or around of an area or location of the production process, at a distance and position so as to be relatively clear of any debris or contamination, and where it is not subject to impact. In the illustrated embodiment, camera 104 is positioned overhead of conveyor 110, camera 106 is positioned overhead of conveyor 112, and camera 108 is positioned overhead of conveyor 114. Each of the conveyors 110, 112, and 114 may be in communication with a control interface 116, which in turn is in communication with central server 102. In addition to the conveyors 110, 112, and 114, control interface 116 may also be in communication with various production stations between the conveyors, such as stations 118 and 120. Thus, central server 102 can manage, via control interface 116, all aspects of the production process in response to input from the cameras 104, 106, and 108. The term "aspects", as used herein and unless stated otherwise or is apparent from context, refers to machinery or other equipment that is part of the production process, e.g., with respect to the depicted process in FIG. 1, conveyors 110, 112, and 114, and stations 118 and 120.

It should be understood that the depicted components are only for illustrative purposes. The actual number of cameras, conveyors, and/or production stations will vary depending upon the needs of a given implementation. Moreover, some items may not be present, e.g. a given production process may not require conveyors, but rather may use different means to transport objects being manufactured. Likewise, rather than presenting a single linear line with one start and one end, some production processes may fork or branch to produce different variations of goods with multiple endpoints, and/or may have multiple starting points. System 100 may be adapted by a person skilled in the relevant art to track objects and control a variety of different types and configurations of production processes without departing from the disclosed inventive concepts.

Central server 102, in embodiments, may be an implementation of a computer device 1500 (see FIG. 5 below) that is capable of executing instructions, such as those discussed with respect to FIG. 6, below. The instructions may be in the form of software that is executable by central server 102. In some embodiments, central server 102 may be implemented using a cloud service or remote data center. In other embodiments, central server 102 may be implemented entirely using hardware, with such hardware using discrete components, one or more integrated circuits, or a combination of both. In still other embodiments, central server 102 may employ a combination of hardware, software, and/or firmware to carry out its functions in system 100. Central server 102 may be located proximate to the various components of the production process, or may be located remote from the components, including potentially in a different location from system 100.

Central server 102 takes as input an image from each of the cameras 104, 106, and 108, and may process the various images to detect and track the location of objects moving through the production process. The term "image" or "images" is used herein to refer to images captured by a camera connected to the system 100, such as cameras 104, 106, or 108. Depending upon the nature of the capturing camera, this image may be a still image, a sequence of still images, or a video or image stream from a video camera. The images may be of any suitable type that can be output by the cameras 104, 106, and 108, and can be processed by central server 102. Based on the tracked locations of the objects, the central server 102 may control one or more aspects of the production process, such as via communication with control interface 116.

In some embodiments, central server 102 may utilize artificial intelligence (AI) of a suitable type, such as one or more machine learning (ML) algorithms, which may include one or more artificial neural networks (ANNs). The ML algorithm, in embodiments, may be configured to detect objects with various appearances, as objects may change in their outer appearance as they proceed through the production process. This detection and tracking may, in embodiments, occur the first time an object enters the field of view of a first camera, such as camera 104, 106, or 108, and thereafter may be accomplished by inference based on known object motion, without need for further ML algorithm processing. In other embodiments, detection and tracking by the ML algorithm may occur with a given object some times or every time the object enters the field of view of a new camera, regardless of whether the object has changed appearance. This will be discussed in further detail below, with respect to FIG. 3.

When central server 102 controls various aspects of the production process in response to the tracked objects, in embodiments, such control may include: adjusting the speed of a conveyor, such as conveyor 110, 112, or 114, adjusting the operation of a station, such as station 118 or 120, and/or adjusting any other aspects of the production process to ensure that the production process runs in an optimal or intended fashion. For example, if one of the stations 118 or 120 needs to be slowed, central server 102 may determine, based on the number and speed of objects on a conveyor leading into the station, that the conveyor needs to be slowed to prevent overloading of the station. For another example, if central server 102 detects that an object leaving a station does not conform to an expected appearance, then central server 102 may control a subsequent conveyor to shunt or otherwise divert the object from the production process, such as to an alternate station for correction or recycling.

Cameras 104, 106, and 108, in the depicted embodiment, each feed an image stream to central server 102 in a format suitable for central server 102 to analyze for locating and tracking objects in the production process. The cameras 104, 106, and 108 may directly connect to central server 102, or may communicate with an intermediate hub (not depicted) which in turn communicates with the central server 102. The cameras 104, 106, and/or 108 may connect to the central server 102 using wired or wireless communications technologies, or a combination of both, depending upon the need of a given implementation. As mentioned above, each camera 104, 106, and 108 is positioned above, around, or away from its respective production process location, at a point where the camera is unlikely to be struck by moving machinery or objects, and where it is essentially clear of any contaminates that may be generated by its associated production process location. Accordingly, downtime for maintenance and repair can be reduced compared to existing solutions that employ sensors placed more proximate to the process location.

Each camera 104, 106, or 108 may be implemented using any suitable imaging technology. In some embodiments, the cameras may be implemented using RGB-sensitive cameras, comparable to those commonly found in smartphones, digital cameras, etc. Such cameras may be off-the-shelf, such as surveillance cameras, webcams, or similar video cameras. In other embodiments, one or more of the cameras 104, 106, and/or 108 may be purpose-built for a specific embodiment, appropriate for a given aspect of the production process. Some examples of variations could include cameras with an increased or varying frame rate, such as a high-speed camera, or a camera configured to detect non-visible light (e.g., ultraviolet, infrared, etc.), a camera equipped with a zoom lens system, an imager capable of detecting into low-light conditions, etc. For example, a production process that includes a heat-based step, such as heat treatment, baking, curing, or a similar process, may employ one or more cameras that are sensitive to infrared light, to allow each object to be assessed for whether it has reached any target temperatures required by the production process. This information may be used by central server 102 to control timing of moving the object through the heat-based step, determining whether the object has cooled sufficiently to proceed to the next step, or any other control operation that may be required by a given implementation.

Figure 2:
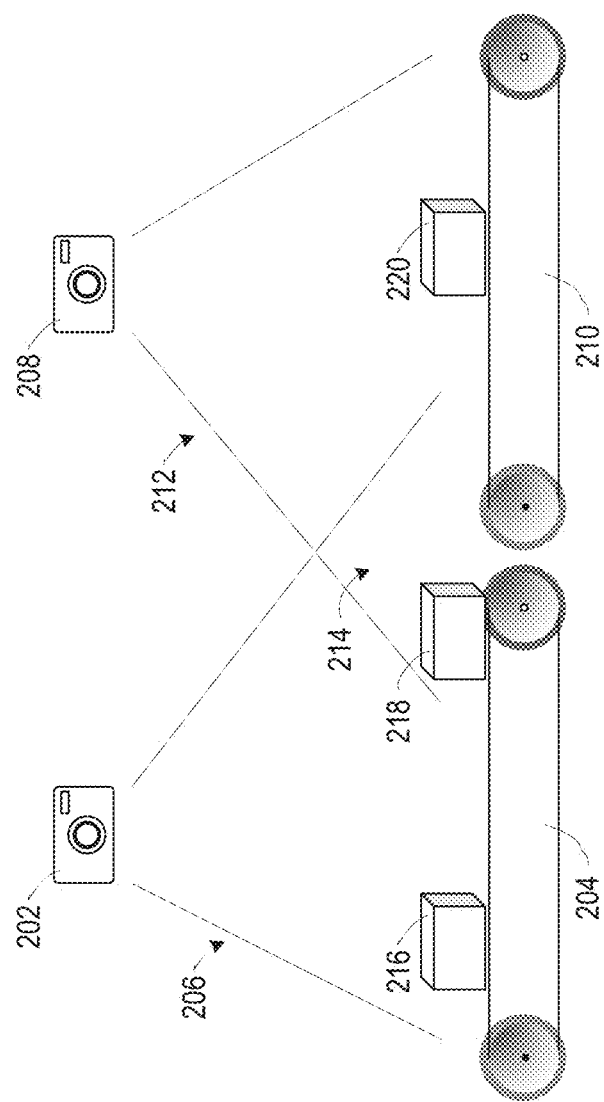
FIG. 2 illustrates an arrangement of cameras and corresponding conveyors where the cameras' fields of view overlap, according to various embodiments.

Each camera 104, 106, and 108 includes a corresponding field of view 122, 124, and 126, respectively. The respective fields of view of each camera, depending upon the specifics of a given embodiments, may allow for visualizing, locating, and tracking objects as they pass through the various locations in the production process associated with each camera. In some embodiments, the fields of view 122, 124, and/or 126 may not overlap, as is visible in FIG. 1. In other embodiments, the fields of view 122, 124, and/or 126 may overlap, as is seen in FIG. 2, discussed below. Depending upon the needs of a specific implementation, only some of the fields of view may overlap, with others separated, such as where an object moves into a covered station where positioning of a camera is not feasible.

Conveyors 110, 112, and 114 are only examples of equipment that may form a part of the production process for transport of objects being processed, and that may be controllable by central server 102. Likewise, stations 118 and 120 may form parts of the production process that perform actions on the objects, such as forming, machining, painting, curing, drying, extruding, molding, sealing, baking, or any other actions appropriate to the goods being produced by the production process.

Control interface 116, in some embodiments, may act as a gateway to translate commands received from the central server 102 to signals or instructions for controlling the appropriate aspects of the production process, e.g. a programmable logic controller (PLC). While control interface 116 is depicted as a stand-alone unit, in other embodiments control interface 116 may be integrated into central server 102, such as with one or more interface cards that can be installed into central server 102. In still other embodiments, a control interface 116 configured to interface with the production process aspects may be unnecessary, such as where the various aspects support off-the-shelf communications, such as USB, Ethernet, WiFi, Bluetooth, or another suitable wired or wireless communications protocol. The specifics for how central server 102 interfaces with aspects of the production process, whether through a control interface 116 or directly, may depend upon the needs of a specific implementation.

FIG. 2 depicts an arrangement of cameras 202 and 208 with associated conveyors 204 and 210, respectively, according to a possible embodiment. The fields of view 206 and 212 of respective cameras 202 and 208 overlap, creating overlap region 214. A first object 216 is upon conveyor 204 and is only within the field of view 206 of camera 202. A second object 218 is nearing an end of conveyor 204, within the overlap region 214, and so is within both the field of view 206 of camera 202, and field of view 212 of camera 208. A third object 220 is upon conveyor 210 and is only within the field of view 212 of camera 208.

As can be seen, the overlap region 214 ensures that the ends of conveyors 204 and 210 that are proximate to each other are within the fields of view of both cameras 202 and 208. In this configuration, as an object travels down conveyor 204 to conveyor 210, it is first tracked by camera 202 when in the position of first object 216. As it approaches the end of conveyor 204, it enters into overlap region 214 when in the position of second object 218, where it is still visible to camera 202 and also becomes simultaneously visible to camera 208. The object transitions onto the start of conveyor 210, still within overlap region 214. Eventually, the object moves to the position of third object 220, leaving the field of view 206 of the camera 202 and staying only within the field of view 212 of the camera 208.

With this overlap region, an object identified and tracked by the central server 102 (FIG. 1) in the view of camera 202 can be continually visually tracked by central server 102 at all times, as it never leaves visible coverage of at least one camera. When in the overlap region 214, the central server 102 can acquire the object in the frame of the video stream from camera 208 and begin tracking it within the camera 208 video stream while still tracking the object within the video stream from camera 202. By knowing the extent of each field of view 206 and 212, such as with known camera intrinsics, the static physical position of each camera 202 and 208, and the speeds of the conveyors 204 and 210, central server 202 can anticipate when the object will enter the field of view 212 based on the located position of an object within field of view 206. As the object will enter the field of view 212 while in overlap region 214, the central server 102 can readily begin tracking the object within field of view 212 without having to relocate the object within the video stream and positively identify it against other similar objects that may also be within field of view 212.

As can be seen in FIG. 2, multiple objects may be visible within a given field of view of a camera. Each of the objects may be separately and uniquely tracked by central server 102. In embodiments, central server 102 not only locates an object as it enters into the field of view of a camera, but may assign the object a unique identifier when it is first or initially located in a first camera at the start of the production process. This unique identifier may be correlated with the object as it is tracked as it moves between the views of the various cameras.

Figure 3:
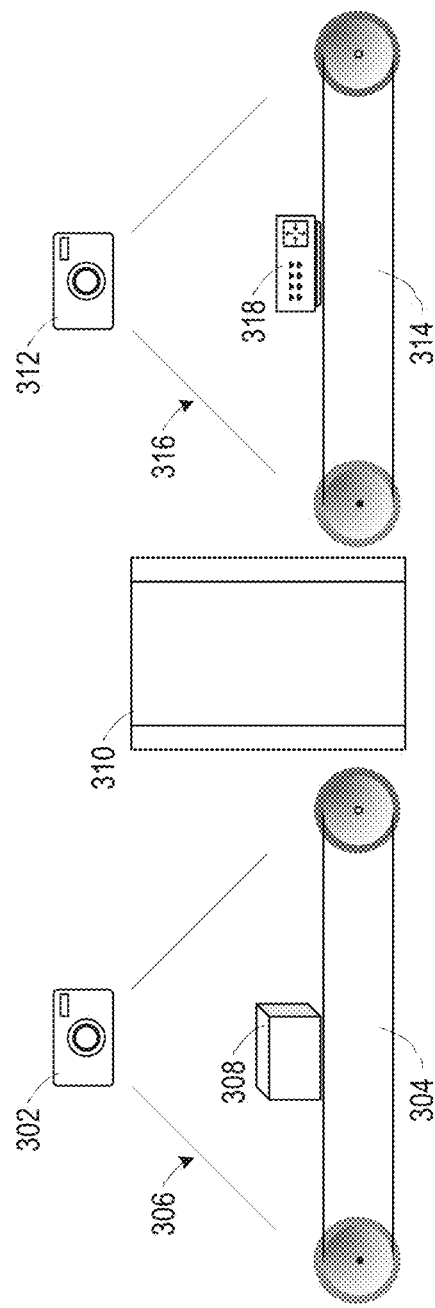
FIG. 3 depicts a production process where an object changes appearance between conveyors, according to various embodiments.

FIG. 3 depicts an arrangement of cameras 302 and 312 that do not share overlapping fields of view, as they are interrupted by a station 310, according to some embodiments. Camera 302 is positioned over corresponding conveyor 304, which is covered by field of view 306. Similarly, camera 312 is positioned over corresponding conveyor 314, which is covered by field of view 316. Between the conveyors 304 and 314 is station 310, which may perform some operation on an object as part of the production process. Within view of camera 302 is first object 308, prior to passing through station 310. Within view of camera 312 is second object 318, which has been processed through station 310, and altered in appearance. Central server 102 (FIG. 1) will assign a unique identifier to object 308, and track it within the field of view 306 of camera 302.

Once the first object 308 enters into station 310, it may no longer be within view of a camera. If the time that an object spends within a given station 310 is known with reasonable certainty, then the object can be reacquired by central server 102 after it leaves station 310 and enters field of view 316 of camera 312 by virtue of timing. For example, if first object 308 spends 30 seconds within station 310, central server 102 can determine that second object 318 entering field of view 316 is the same first object 308 that departed field of view 306 thirty seconds earlier, regardless of whether the object has changed appearance. It can then associate the unique identifier of the previously tracked object to the object when reacquired in field of view 316 of camera 312. Conversely, in some embodiments, if an object enters into field of view 316 and central server 102 cannot correlate it to an object that left the field of view 306 thirty seconds prior, then central server 102 can determine an anomaly has happened in the production process. The central server 102 can then take any steps that are appropriate to resolve the anomaly, such as modifying the speed of conveyors 304 or 314, and/or of station 310, or notifying personnel that the production process requires maintenance, or any other appropriate actions, depending upon the needs of a given embodiment.

As mentioned above and as illustrated in FIG. 3, an object may change appearance as it moves along a production process. Where central server 102 employs AI to handle locating and tracking of an object in the production process, the AI may be trained to recognize the various appearances of the object that are expected to be seen at each camera location within the various aspects of the production process. Referring to the example depicted in FIG. 3, first object 308 illustrates a raw block prior to processing in station 310. Following processing, first object 308 has been refined into second object 318, which is substantially different in appearance from first object 308. To ensure accurate tracking of the object as it changes appearance, an embodiment employing AI in central server 102 can train the AI with image sets to recognize all possible variations of the object appearance, for all possible aspects of the production process that are monitored by cameras. In some implementations, this training may involve using training sets on an ANN iteratively to tune the ANN. In other ML implementations, a database of many different variations of the object may be employed as a reference, such as with an object matching algorithm. Such an AI or ML system may be useful to locate and track each object as it moves into the field of view of each camera in the production process.

An AI implemented on central server 102, in embodiments, may be of any suitable ML algorithm. In some embodiments, the AI is a form of artificial neural network (ANN). The ANN in such embodiments may act at least partially as an image classifier, and may be trained to specifically detect the objects being processed in the production process. As part of detection, the AI may determine the location of a given object within the image stream, and track it as it moves through the field of view of the camera supplying the image stream. In embodiments where multiple objects may be within one aspect, and so in view of a single camera, the AI may track multiple objects simultaneously. In other embodiments, multiple instances of the AI may be spun up as needed, with one AI instance used to track one object within a field of view. In still other embodiments, a separate AI instance may be assigned to process the images from each individual camera, with each separate AI instance being trained on the appearance of the object expected in its associated aspect of the production process.

While FIGS. 1 and 3 illustrate stations for steps in a production process that are not subject to view from a camera, this is only one possible embodiment. It should be understood that, in some embodiments, at least one or more of the various stations of a production process may also be capable of being monitored by one or more cameras, depending upon the nature of the actions being carried out upon objects in the production process.

Figure 4:
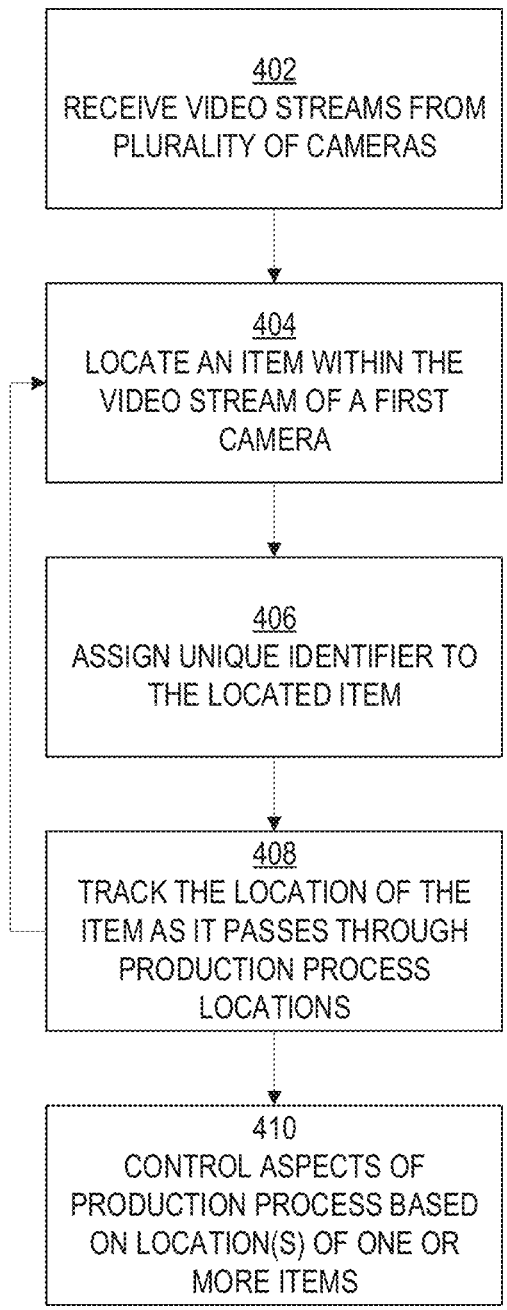
FIG. 4 is a flowchart for an example method for controlling a production process using object tracking, according to various embodiments.

FIG. 4 is an example method 400 of the operations for object tracking and control of a production process using overhead cameras, such as example system 100 (FIG. 1). The operations of method 400 may be carried out in whole or in part, depending upon the needs of a given embodiment. Further some operations may be omitted, some operations may be added, and the order of operations may be rearranged depending upon the requirements of a given embodiment. The operations of method 400 may be carried out by one or more components of a system, such as system 100. Some or all operations may be carried out by a server, and/or by another device within the system, or both. Much of the functionality described below in each operation corresponds with various components described above with respect to FIGS. 1-3, and the reader is directed to the foregoing description of the same. Moreover, some aspects of a given operation may be instead carried out as part of a different operation, depending upon the specifics of a given implementing system.

In operation 402, in embodiments, a server, such as server 102, receives images from a plurality of cameras. Each of the cameras has an associated location within the production process.

In operation 404, the server locates an item or object within the field of view of an initial camera within the production process. In embodiments, the initial camera may be located at the beginning or intake of the production process, if the process is desired to be tracked from its beginning. For example, a process to make finished lumber may have an initial camera at the point where a raw log is placed onto a first intake conveyor. The server may include an ML or AI algorithm, which may be trained, include a database, or otherwise be configured to recognize the appearance of an object at each point of the production process where it changes or is otherwise altered. The ML algorithm thus detects an initial object within the frame of the video stream. Where the frame may image multiple objects, each object may be identified and located in turn as it initially enters the frame.

In operation 406, a unique identifier is assigned to each located item, so it can be correlated as necessary with the production process. In some embodiments, the unique identifier may be a serial number associated and/or affixed to its object. In other embodiments, the unique identifier may be used only for internal tracking purposes, such as tracking movement through the production process.

In operation 408, in embodiments, the location of each object is tracked as it moves through the production process. As discussed above, in some aspects, cameras may be configured to have overlapping fields of view to facilitate continuous object tracking. In other aspects of the production line, there may be areas where cameras cannot be deployed. Tracking between discontinuous fields of view may be accomplished by knowledge of the speed at which each object is moving through each consecutive field of view, along with knowing the amount of time it takes for an object to pass out of a first field of view and back into a second field of view. In other embodiments, where the second field of view has no objects, when the first of a line of objects leaves the first field of view, it is automatically taken to be the same object when a first of the line of objects enters the second field of view. Each object will be re-associated with its unique identifier as it enters each field of view.

As seen in FIG. 4, operations 404, 406, and 408 may iterate repeatedly as the production process is run, tracking each object as it proceeds through the production process.

Finally, in operation 410, in embodiments, various aspects of the production process are controlled as a result of tracking each object. Tracking each object may allow the speed of various conveyors and stations of the production process to be adjusted to ensure the production process proceeds optimally, and/or at peak efficiency. Similarly, where objects are detected that do not match the training or database of the ML system, those objects can be flagged as defective or bad, and removed from the line or shunted to a different process for repair. Likewise, counts of items and unique identifiers can be used to control branching of the production process, such as diverting some objects to different stations for different processing, e.g. different paint finishes may be effected by diverting objects to various stations each equipped with one paint finish, or products in a packaging or distribution facility may be diverted or transferred to various stations for shipping to different recipients or packaging in different quantities, etc. Tracking that indicates that a particular object or objects are not at a particular location at an expected time can signal the server that some aspect of the production process has stalled or malfunctioned, and is in need of repair or attention.

Figure 5:
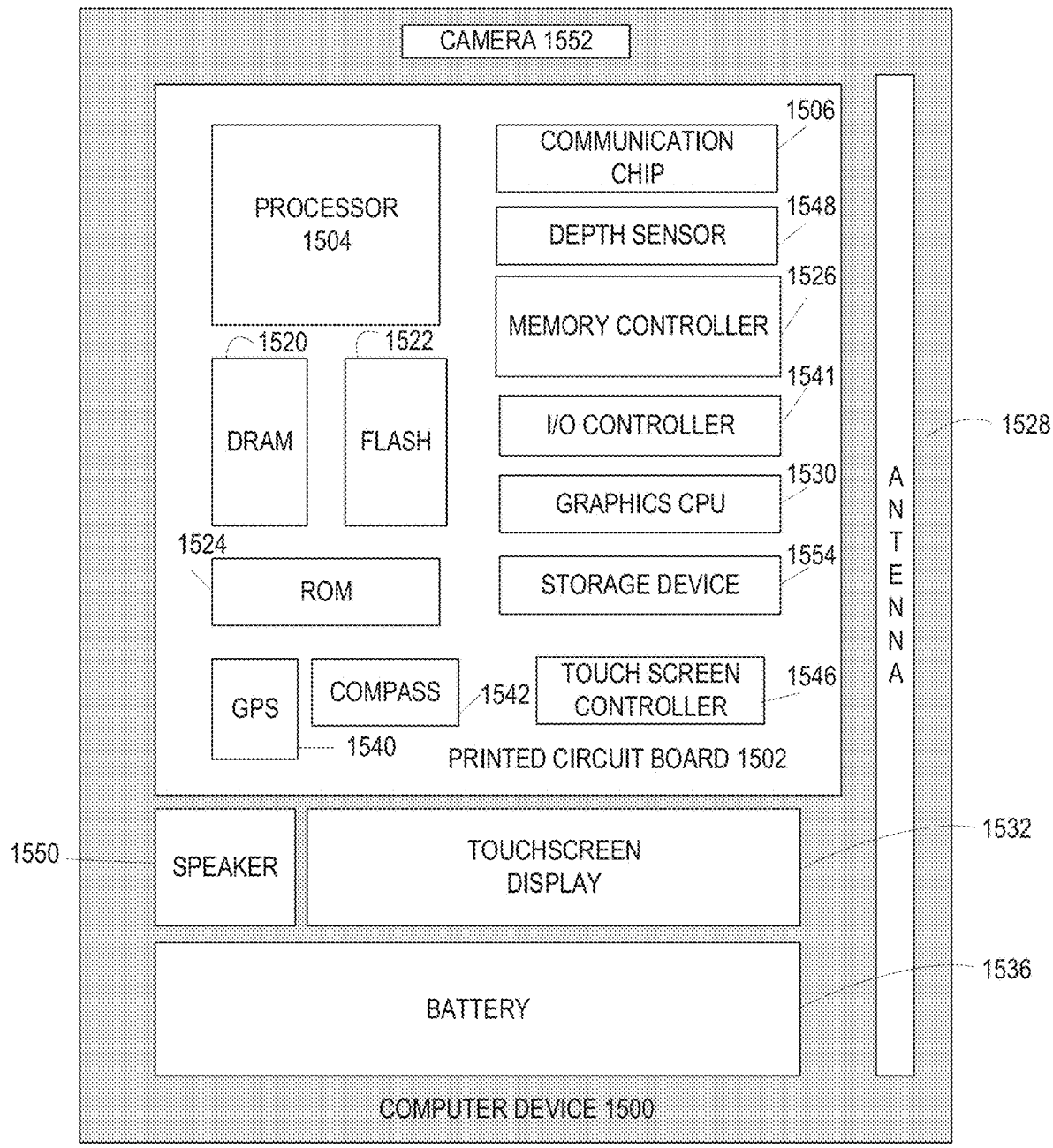
FIG. 5 is a block diagram of an example computer that can be used to implement some or all of the components of the disclosed systems and methods, according to various embodiments.

FIG. 5 illustrates an example computer device 1500 that may be employed by the apparatuses and/or methods described herein, in accordance with various embodiments. As shown, computer device 1500 may include a number of components, such as one or more processor(s) 1504 (one shown) and at least one communication chip 1506. In various embodiments, one or more processor(s) 1504 each may include one or more processor cores. In various embodiments, the one or more processor(s) 1504 may include hardware accelerators to complement the one or more processor cores. In various embodiments, at least one communication chip 1506 may be physically and electrically coupled to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display, a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a depth sensor 1548, a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or storage device 1554 may include associated firmware (not shown) storing programming instructions configured to enable computer device 1500, in response to execution of the programming instructions by one or more processor(s) 1504, to practice all or selected aspects of system 100 or method 400 described herein. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, smart glasses, or a server. In further implementations, the computer device 1500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1602 may include a number of programming instructions 1604. Programming instructions 1604 may be configured to enable a device, e.g., computer 1500, in response to execution of the programming instructions, to implement (aspects of) system 100 or method 400 described above. In alternate embodiments, programming instructions 1604 may be disposed on multiple computer-readable non-transitory storage media 1602 instead. In still other embodiments, programming instructions 1604 may be disposed on computer-readable transitory storage media 1602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A system for tracking items within, and controlling, a production process, comprising:
    a plurality of cameras, each of the plurality of cameras positioned above or around a corresponding location of the production process;
    a server in data communication with the plurality of cameras; and
    an interface in communication with the server to control one or more aspects of the production process in response to images from one or more of the plurality of cameras,
    wherein the server is to:
        assign a unique identifier and a location to each item of a plurality of items as the item enters a field of view of a first one of the plurality of cameras,
        track the location of each item as it passes through each corresponding location, and
        control the one or more aspects of the production process based on a change in an appearance of each item as it passes through each corresponding location.

2. The system of claim 1, wherein the server is to track the location of each item based upon its last known location, a direction of travel, and a speed of travel.

3. The system of claim 1, wherein the server executes an artificial intelligence (AI) algorithm that is trained to recognize each of the plurality of items.

4. The system of claim 3, wherein the AI algorithm initially detects and determines the location of each item prior to tracking the location of each item.

5. The system of claim 3, wherein the AI algorithm is trained to recognize the appearance of an item of the plurality of items as it appears at each of a plurality of locations.

6. The system of claim 1, wherein the fields of view of at least a subset of the plurality of cameras overlap each other.

7. The system of claim 1, wherein the server is further to control, in response to the images from the one or more of the plurality of cameras, a speed of one or more conveyors that comprise the production process.

8. The system of claim 1, wherein the server is further to control, in response to the images from the one or more of the plurality of cameras, a path that an item of the plurality of items takes through the production process.

9. A computer-readable medium (CRM) comprising instructions that, when executed by a processor of an apparatus, cause the apparatus to:

receive, from a plurality of cameras, a plurality of images, each corresponding to one of a plurality of locations of a production process;

assign a unique identifier and a location to each item of a plurality of items as each item enters a field of view of a first one of the plurality of cameras;

track the location of each item as each item passes through each corresponding location of the plurality of locations; and control one or more aspects of the production process in response to a change in an appearance of each item as it passes through each corresponding location, as determined from the plurality of images.

10. The CRM of claim 9, wherein the instructions are to further cause the apparatus to track the location of each item based upon its last known location, a direction of travel, and a speed of travel.

11. The CRM of claim 9, wherein the instructions are to further cause the apparatus to implement an artificial intelligence (AI) algorithm that is trained to recognize each of the plurality of items.

12. The CRM of claim 11, wherein the instructions are to cause the AI algorithm to detect and determine the location of each item prior to tracking the location of each item.

13. The CRM of claim 11, wherein the AI algorithm is trained to recognize the appearance of an item of the plurality of items as it appears at each of the plurality of locations.

14. The CRM of claim 9, wherein the instructions are to further cause the apparatus to control, in response to the images from one or more of the plurality of cameras, a speed of one or more conveyors that comprise the production process.

15. The CRM of claim 9, wherein the instructions are to further cause the apparatus to control, in response to the images from one or more of the plurality of cameras, a path that an item of the plurality of items takes through the production process.

16. A method for controlling a production process, comprising:
receiving, at a server from a plurality of cameras, a plurality of images, each corresponding to one of a plurality of locations of a production process;

assigning, by the server, a unique identifier and a location to each item of a plurality of items as each item enters a field of view of a first one of the plurality of cameras;

tracking, by the server, the location of each item as each item passes through each corresponding location of the plurality of locations; and controlling, by the server, one or more aspects of the production process in response to a change in an appearance of each item as it passes through each corresponding location, as determined from the plurality of images.

17. The method of claim 16, wherein tracking the location of each item comprises tracking the location of each item based upon its last known location, a direction of travel, and a speed of travel.

18. The method of claim 16, further comprising recognizing, with an artificial intelligence (AI) algorithm, each of the items as it appears in a field of view of a first one of the plurality of cameras.

19. The method of claim 18, further comprising determining, with the AI algorithm prior to tracking the location of each item, the location of each item within the field of view of the first one of the plurality of cameras.

20. The method of claim 18, further comprising training the AI algorithm to recognize the appearance of an item of the plurality of items as it appears at each of the plurality of locations.

21. The method of claim 16, further comprising controlling, by the server in response to the images from one or more of the plurality of cameras, a speed of one or more conveyors that comprise the production process.

22. The method of claim 16, further comprising controlling, by the server in response to the images from one or more of the plurality of cameras, a path that an item of the plurality of items takes through the production process.

* * * * *